United States Patent [19]
Lyman et al.

[11] Patent Number: 5,664,396
[45] Date of Patent: Sep. 9, 1997

[54] VACUUM INSULATION PANEL

[75] Inventors: Bruce E. Lyman, Northfield; Timothy A. Neeser, Savage, both of Minn.

[73] Assignee: MVE, Inc., New Prague, Minn.

[21] Appl. No.: 581,182

[22] Filed: Dec. 29, 1995

[51] Int. Cl.$^6$ ............................................. E04C 2/34
[52] U.S. Cl. .................. 52/788.1; 52/795.1; 428/624
[58] Field of Search ............................ 52/783.1, 788.1, 52/790.1, 795.1; 428/621, 624, 634, 586

[56] References Cited

U.S. PATENT DOCUMENTS

| | | | |
|---|---|---|---|
| 2,939,811 | 6/1960 | Dillon | 52/788.1 X |
| 3,264,165 | 8/1966 | Stickel | 52/788.1 X |
| 4,579,756 | 4/1986 | Edgel | 52/788.1 X |
| 5,107,649 | 4/1992 | Benson et al. | 52/788.1 X |
| 5,157,893 | 10/1992 | Benson et al. | 52/788.1 X |
| 5,175,975 | 1/1993 | Benson et al. | 52/788.1 |
| 5,252,408 | 10/1993 | Bridges et al. | 52/788.1 X |
| 5,500,305 | 3/1996 | Bridges et al. | 52/788.1 X |

Primary Examiner—Carl D. Friedman
Assistant Examiner—Yvonne Horton-Richardson
Attorney, Agent, or Firm—Rudnick & Wolfe

[57] ABSTRACT

A vacuum insulation panel is comprised from a base and a cover member joined together to define an inner cavity. The cover is provided with a planar fastening surface for bonding the vacuum panel to a target surface to be insulated. A peripheral rounded corner around the fastening surface is configured to eliminate deformation of the fastening surface due to atmospheric forces arising from the evacuation of the inner cavity. The rounded peripheral corner of the cover is configured to permit lateral expansion of the cover member to accommodate lateral expansion of the base member during evacuation. The corner also adds strength to the panel cover, permitting the inner fiber glass mat to be formed with a void near the flange weld and eliminating the risk of weld contamination by the fiber glass material during assembly. The fastening surface remains planar and disposed above the outer flange after evacuation of the panel, thus providing an improved fastening surface compared to prior art vacuum panels.

5 Claims, 2 Drawing Sheets

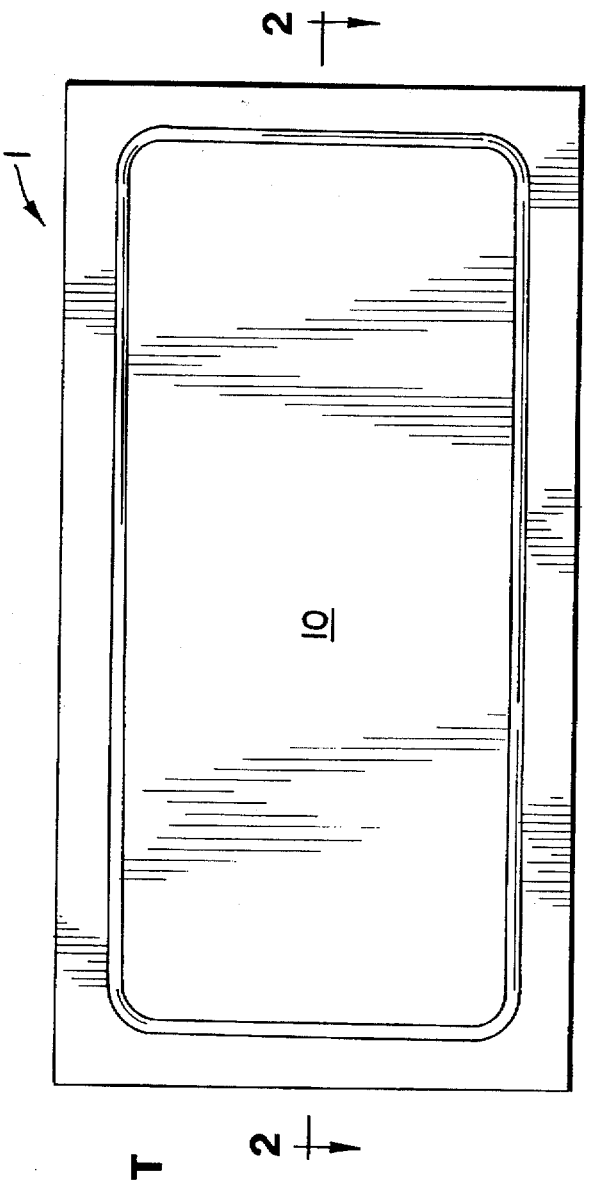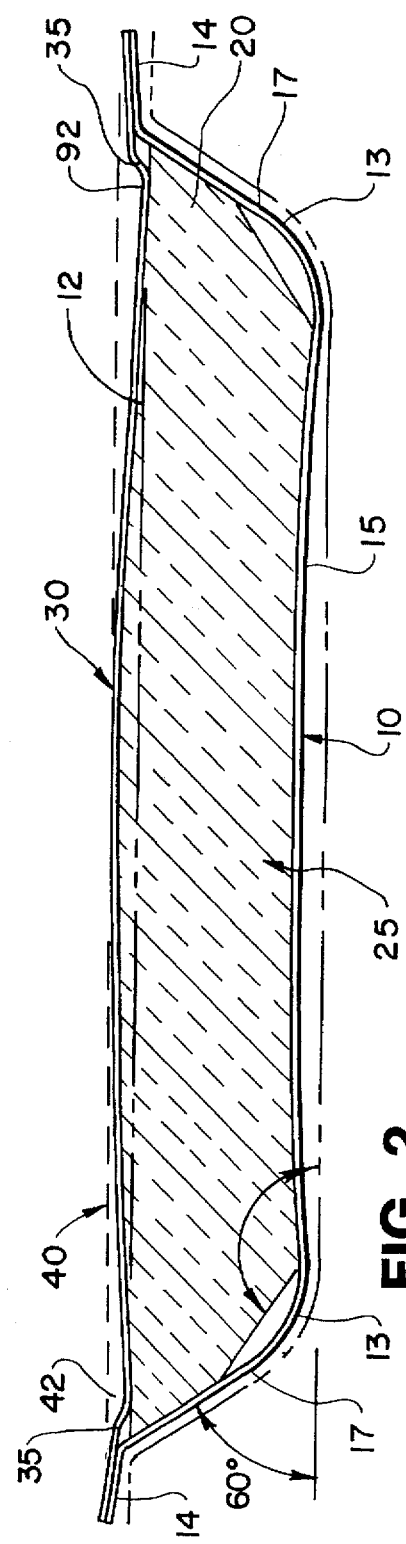
FIG. 1 PRIOR ART
FIG. 2 PRIOR ART

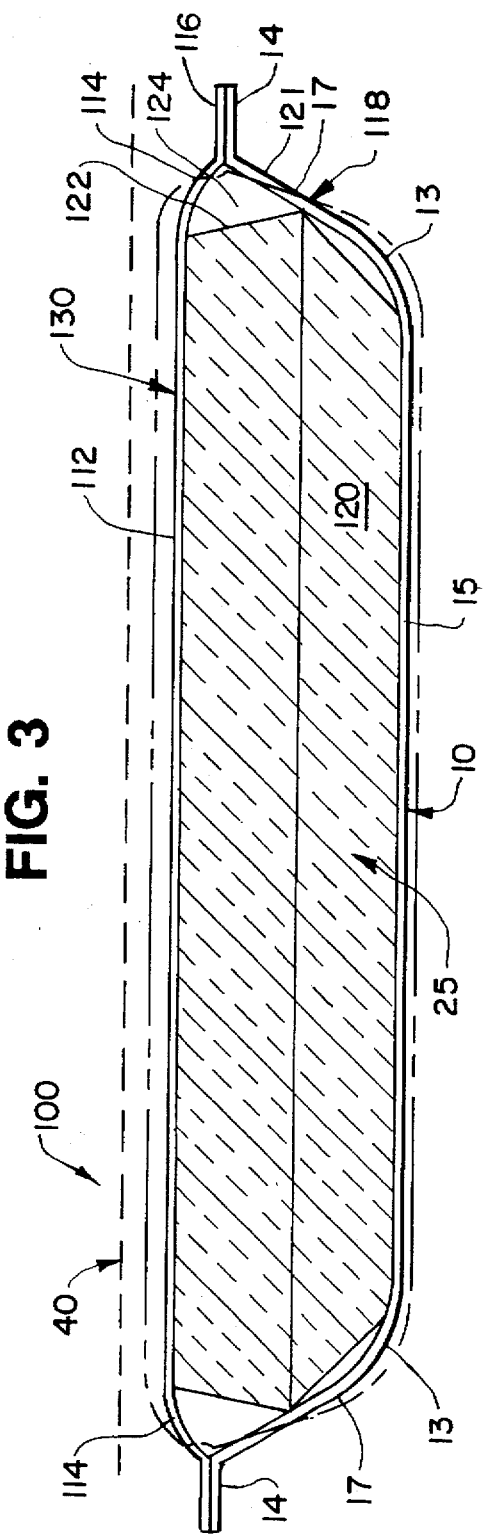
FIG. 3
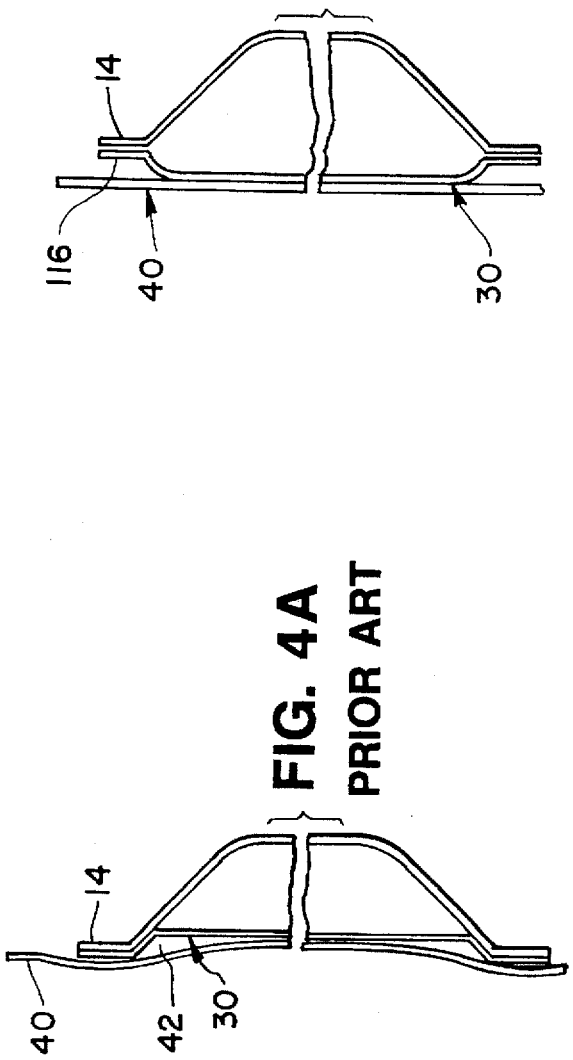
FIG. 4A PRIOR ART
FIG. 4B 5,664,396

VACUUM INSULATION PANEL

BACKGROUND OF THE INVENTION

The invention relates generally to vacuum insulation panels. More particularly, the invention relates to an improvement for eliminating deformation in a fastening surface for a vacuum panel.

Vacuum insulation panels are now in widespread use in thermal insulation applications which include refrigerators, ovens and cryogenic storage vessels. These panels are extremely efficient at insulating against heat transmission. The insulating efficiency of the panels depend on the degree of evacuation achieved on the panel interior during manufacture and on the ability of the panel to maintain the internal vacuum throughout its useful life.

Referring to FIGS. 1 and 2, known vacuum panels are typically formed by welding a pan-shaped base 10 to a flat cover 12 to define an internal space 25. FIG. 2 illustrates a cross-section of a known vacuum panel, wherein dotted lines denote the panel shape prior to application of a vacuum to the internal space 25 and solid lines denote the panel shape after application of the internal vacuum. As used herein the term "evacuation"0 refers to the application of an internal vacuum to the panel. The term "atmospheric loading"0 refers to the forces due to atmospheric pressure on a panel which has been evacuated. Base 10 is formed as a generally rectangular bottom surface 15 which extends into a smoothly rounded peripheral corner section 13. Corner section 13 further extends into an inclined wall 17, and an outer flange 14. Cover 12 is formed as a planar sheet and is joined to flange 14 of the base 10 by welding to hermetically seal the panel. Cover 12 forms a fastening surface 30 by which the vacuum panel is bonded to a generally planar target surface (represented by the line 40), which is the surface desired to be mounted and insulated by the panel.

Application of the internal vacuum is accomplished via one or more seal-off ports (not shown) provided on the base or cover. The seal-off port is typically provided with slot apertures disposed in a recessed portion of the panel. Solid braze material is placed in the recess adjacent the apertures so that molten braze material flows into the slots to seal the panel. The entire panel is usually placed in a vacuum chamber where the panel is sealed after appropriate steps have been taken to ensure evacuation of the internal space. Sealing of the seal-off port occurs within the vacuum chamber using a specialized radiant heater head designed for local heating of the braze.

The base 10 and cover 12 are preferably formed from sheet metal, which provides an excellent barrier to gases that would migrate into the interior vacuum cavity during the life of the panel. Preferably, both the cover and base are made of 3 mil stainless steel; however, carbon steel or other suitable material may be used. For example, T304L stainless steel is particularly well suited for the vacuum panel of the invention because it is not gas permeable and is cost effective, readily available, formable, has low outgassing, good corrosion resistance, low thermal conductivity, and a high melting temperature.

A fiberglass mat 20 is typically placed within the panel before the base 10 and cover 12 are welded together. The glass mat is compressed during assembly of the panel and provides added insulation characteristics as well as structural support for the panel walls. Mat 20 may comprise, for example, a dense glass wool manufactured by Owens-Corning Fiberglass, Toledo, Ohio having a density in the range of 9.0 to 20.0 pounds per cubic foot. The mat 20 is compressed during assembly of the panel and functions to provide insulation against heat transfer and to support the panel walls against the forces of atmospheric pressure.

Generally, a lower density glass mat has a higher effectiveness as an insulator. On the other hand, a lower density mat provides less structural support to the panel walls. Thus, some insulating efficiency may be sacrificed in order to achieve a given degree of structural support for the panel walls.

Referring again to FIG. 2, one problem with prior art vacuum panels is that they tend to deform under atmospheric loading. Fastening surface 30 develops steps 35 under atmospheric loading as previously flat cover 12 collapses inwards toward the center of the panel. The panel is fastened to the target surface by applying adhesive to the fastening surface 30.

Atmospheric loading of the evacuated panel also yields deformation in the fastening surface 30 by causing it to buckle. Buckling results from a reduction in the lateral dimension of the base 10 as walls 17 and corners 13 move inwards under atmospheric forces. Bottom surface 15 also buckles upwards since the shrinkage in the lateral dimensions of the panel base 15 cannot be accomodated by bottom surface 15.

As can be seen from FIGS. 2 and 4A, the deformed fastening surface 30 of prior art panels results in gaps 42 between the fastening surface 30 and the target surface 40. FIG. 4A is exagerrated somewhat to illustrate the shape undertaken by the target surface 40 when the prior art panel is bonded thereto. Compression resulting from evacuation of the panel causes flange 14, and that part of cover 12 attached to flange 14, to be raised with respect to fastening surface 30. The raised flange 14 contributes to a reduction in the adhesion surface area available and to deformation of the surface to which the panel is bonded. The target surface 40 is typically thin sheet metal (0.035 in.) and conforms to the shape of fastening surface 30. This conformance of the target surface creates large depressions therein which are cosmetically undesirable. These imperfections decrease the effectiveness of the vacuum panel as a thermal insulator and reduce the surface area available to fasten the panel to the target surface.

Another problem with prior art panels is that, during assembly, the fiber glass mat material may migrate between the cover and base flanges, contaminating the welds therebetween. Since the glass mat is necessary to provide support against atmospheric loading to the cover, even in the area of the flange welds, the problem of weld contamination has heretofore been tolerated as a necessary consequence of the panel design.

Another problem with prior art panels is that during assembly, the fiber glass mat material must be compressed with a load equal to atmospheric pressure forces. This is necessary to reduce the amount of warping of the fastening surface 30 and is undesirable during the manufacturing process because very large forces are frequently required for panels having large surface areas.

There is thus desired a vacuum panel which provides a fastening surface that does not tend to deform as a result of atmospheric loading and which facilitates complete contact with the target surface. There is also desired a vacuum panel which provides increased weld quality between the cover and base members and which solves the aforementioned problems of the prior art.

SUMMARY OF THE INVENTION

The present invention provides a vacuum panel having a fastening surface which resists deformation under atmospheric loading and simplifies assembly. Vacuum panels according to the present invention are provided with a cover having a curved peripheral corner portion which permits deformation of the cover member without buckling of the fastening surface. The cover interacts with the base in the welded vacuum panel to ensure that the fastening surface does not buckle upon application of a vacuum to the internal space. The rounded peripheral corner increases the strength of the panel near the flanges and eliminates the need for fiber glass mat in the vicinity of the flanges, thus reducing the likelihood that fiber glass will contaminate the flange welds during assembly.

BRIEF DESCRIPTION OF THE DRAWINGS

FIG. 1 illustrates a plan view of a vacuum panel according to the prior art as described above.

FIG. 2 is a cross-section taken along line 2—2 of FIG. 1 as described above.

FIG. 3 is a cross-section of a panel according to a preferred embodiment of the invention.

FIG. 4A is cross-sectional view of a prior art vacuum panel showing the deformation of the target surface to which the panel is bonded.

FIG. 4B is a cross-sectional view of a vacuum panel according to a preferred embodiment of the invention and the target surface to which it is bonded.

DESCRIPTION OF THE PREFERRED EMBODIMENTS OF THE INVENTION

Referring to FIG. 3, panel 100, according to a preferred embodiment of the invention, is constructed with a cover 112 having a peripheral rounded corner 114 which extends into a peripheral flange 116. The rounded corner 114 is preferably formed to assume a radius of approximately 0.40 inches under atmospheric loading. The unevacuated panel is of the shape shown in dotted lines. The panel thickness, measured from fastening surface 130 to bottom surface 15 is approximately 1.11 inches prior to evacuation of the panel. A panel thickness compression on the order of 10% occurs under atmospheric loading. Preferably, fastening surface 130 is disposed approximately 0.23 inches above peripheral flange 116 prior to evacuation of the panel. Base 10 has a depth measured from peripheral flange 14 to bottom surface 15 of approximately 0.88 inches prior to panel evacuation and 0.86 inches after atmospheric loading.

As can be seen from FIG. 3, upon application of the internal vacuum, panel 100 deforms from the shape shown in dotted lines to the shape shown in solid lines. Applicants have discovered, quite unexpectedly, that, because of the unique interaction between the base 10 and the cover 112, no buckling or deformation of fastening surface 130 occurs when the panel is constructed according to the present invention. Wall 17 of base 10 does not uniformly shrink towards the panel center as was the case in prior art panels. Rather, a point 118 of the wall 17 remains in the same position before and after atmospheric loading while corner 13 of base 10 moves inward and the upper portion 121 of wall 17 moves outward from the panel center.

The above described deformation of the base 10 results from the ability of the cover 112, according to the present invention, to accommodate the lateral movement of the wall 17 and flange 14 of the base 13. Rounded corner 114 permits lateral, outward movement of flange 116, which is welded to flange 14, thus permitting base 10 to deform as shown and permitting fastening surface 130 to remain substantially planar and parallel to bottom surface 15. This design allows the panel assembly to be performed without additional compression of the glass mat.

Rounded corners 114 also provide structural support to cover 112 against atmospheric forces on the evacuated panel. Hence, glass mat 120 may be formed with an inclined surface 122, causing a void 124 in the area of rounded corner 114 and flanges 116 and 14. Glass mat 120 is not disposed in the vicinity of the weld between flanges 116 and 14 as was the case in prior art panels. The risk of weld contamination by the fiber glass mat material is thereby substantially reduced.

As can be seen in FIG. 4B, when the vacuum panel according to the present invention is adhered to the target surface 40, there is no deformation of the target surface. Flanges 14 and 116 are removed from the target surface and thereby eliminate deformation of the target surface and maximize the surface area available for bonding fastening surface 30 to target surface 40.

It is to be understood that while a preferred embodiment has been described in some detail with respect to the drawings numerous changes in the construction in details of the vacuum panel can be made without departing from the spirit and scope of the invention as set forth in the appended claims.

What is claimed is:

1. A vacuum insulating panel comprising:
  a) a base having a planar bottom surface, a peripheral wall extending from the bottom surface, and a first peripheral flange extending from the wall substantially parallel to the bottom surface;
  b) a cover having a generally planar fastening surface intended for attachment to a surface to be insulated, rounded corner portions extending from the periphery of the fastening surface, and a second peripheral the base and the from said rounded corner portions; the base and the cover being hermetically sealed at the first and second peripheral flanges;
  c) said rounded corner portions having a radius of approximately 0.40 inches, prior to evacuation, to permit lateral movement of panel during evacuation to prevent deformation of said planar fastening surface;
  thereby to ensure secure bonding of said fastening surface to the surface to be insulated.

2. The vacuum panel of claim 1, wherein fiberglass mat is provided in the inner cavity to support the fastening surface and bottom surface against atmospheric loading.

3. The vacuum panel of claim 2, wherein said glass mat is provided with a void adjacent said rounded corner portion to prevent migration of glass between the first and second flanges during fastening of the flanges.

4. The vacuum panel of claim 3, wherein said glass mat is compressed by approximately 10% during evacuation of the panel due to atmospheric pressure forces.

5. The vacuum panel of claim 1, wherein the peripheral flanges are removed from the plane of the surface to be bonded to permit maximum surface area available for bonding and to prevent deformation of the surface to be bonded.

* * * * *

UNITED STATES PATENT AND TRADEMARK OFFICE
CERTIFICATE OF CORRECTION

PATENT NO. : 5,664,396

DATED : September 9, 1997

INVENTOR(S) : Bruce E. Lyman and Timothy A. Neeser

It is certified that error appears in the above-identified patent and that said Letters Patent is hereby corrected as shown below:

Claim 1, lines 9-10, "a second peripheral the base and the from said rounded corner portions;" should be --a second peripheral flange extending from said rounded corner portions;--.

Signed and Sealed this

Ninth Day of December, 1997

Attest:

BRUCE LEHMAN

Attesting Officer

Commissioner of Patents and Trademarks